United States Patent Office 2,831,394
Patented Apr. 22, 1958

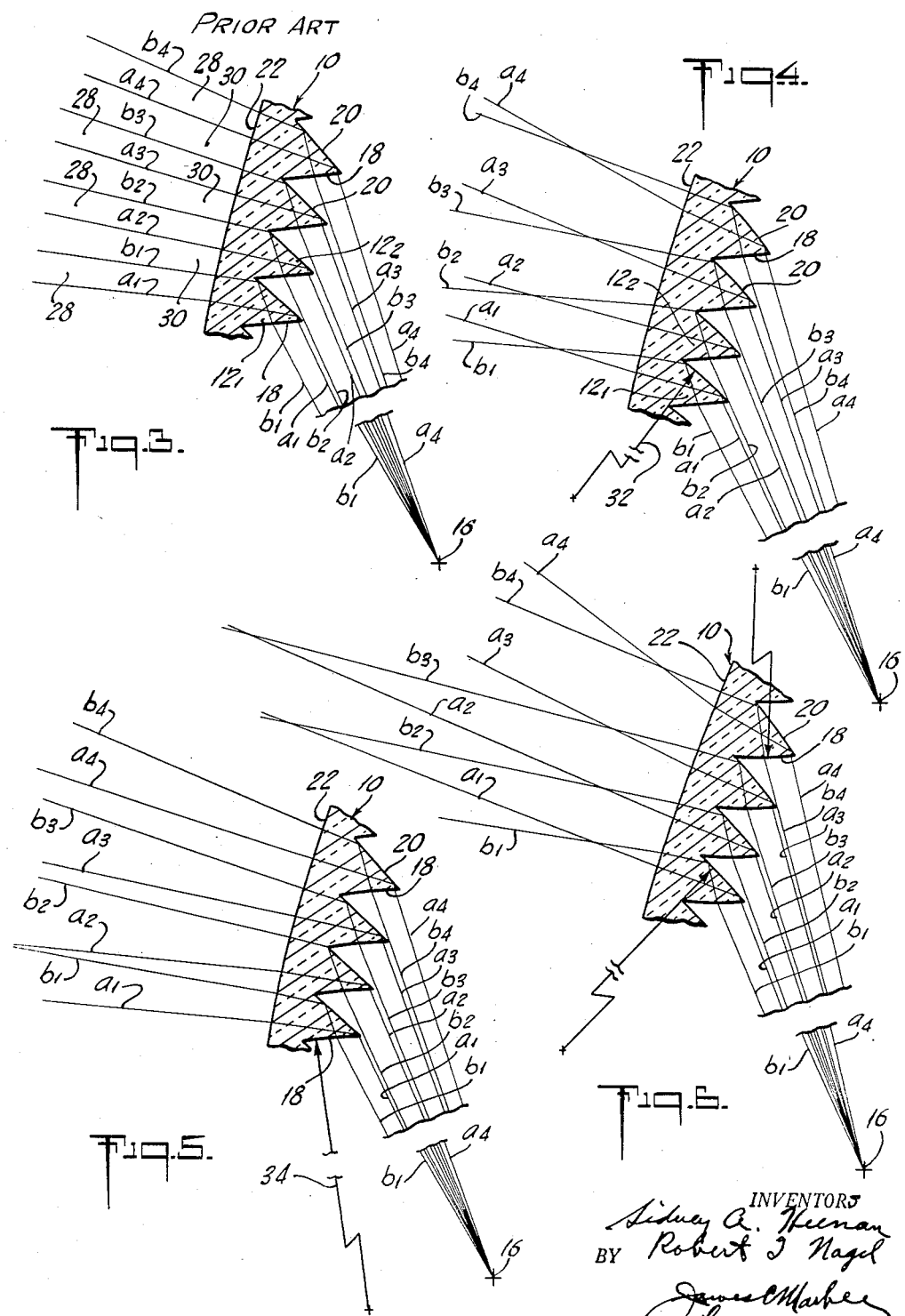

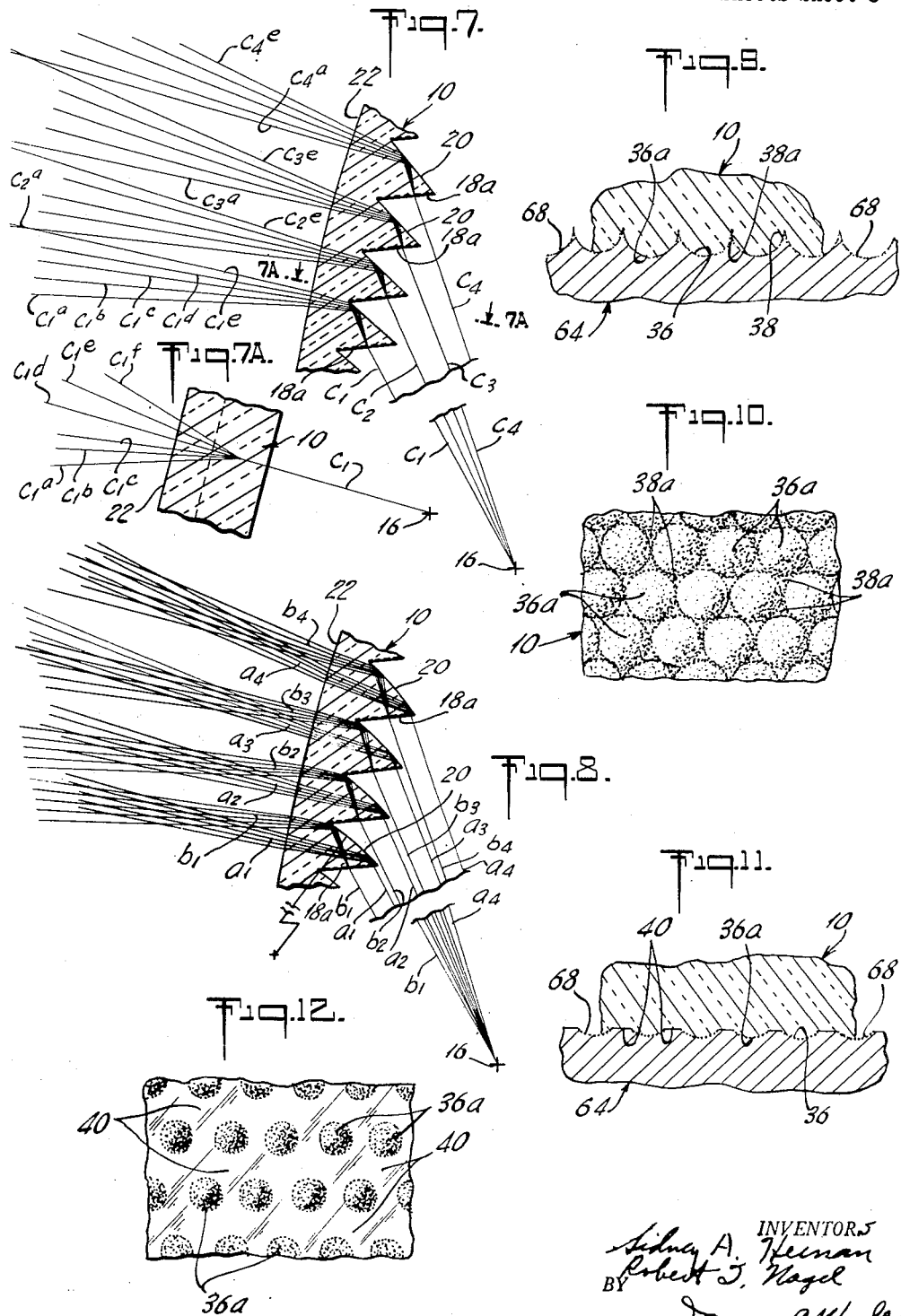

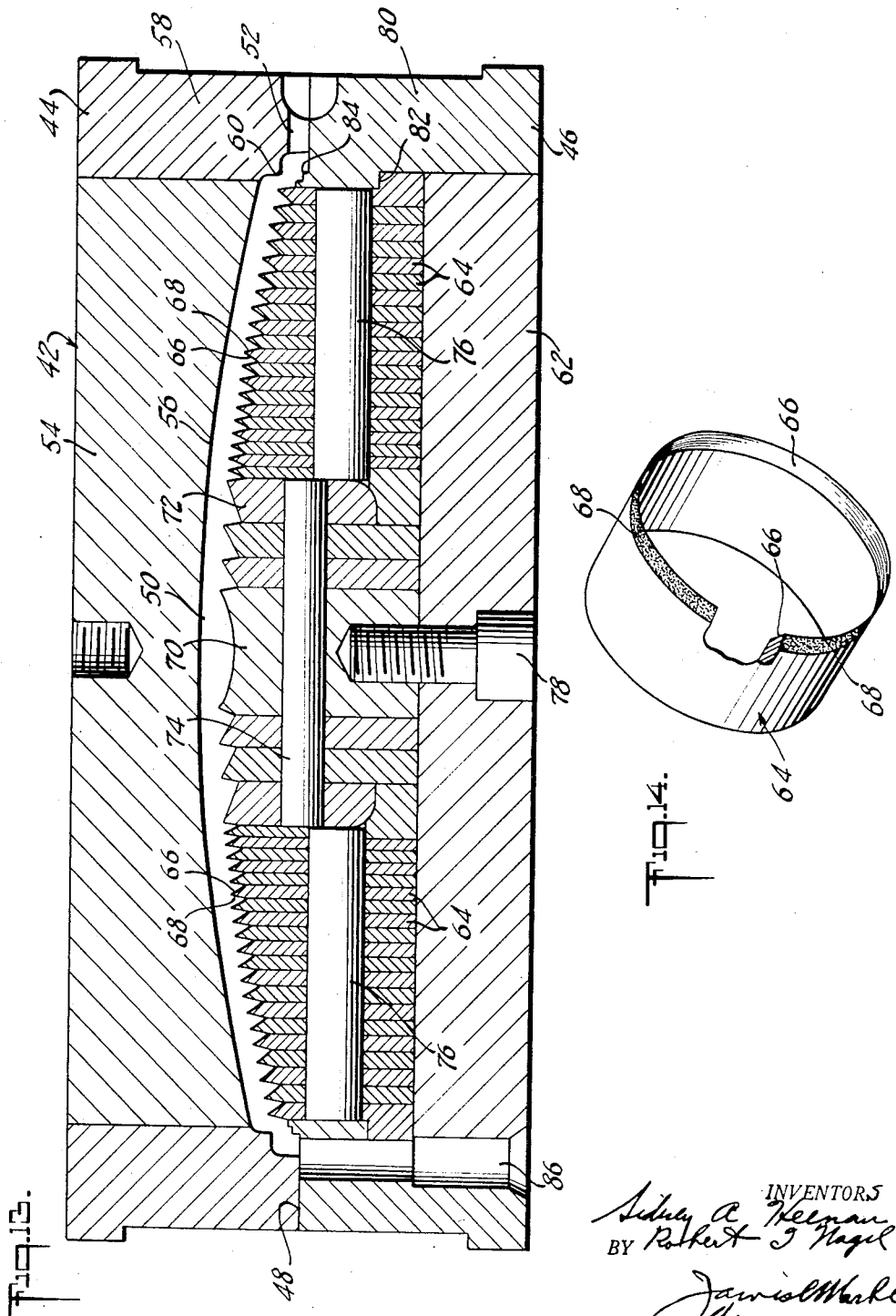

2,831,394
CATADIOPTRIC LENSES

Sidney A. Heenan, Park Ridge, and Robert I. Nagel, Chicago, Ill., assignors to Elastic Stop Nut Corporation of America, Union Township, N. J., a corporation of New Jersey Application August 22, 1952, Serial No. 305,736

9 Claims. (Cl. 88—57)

The present invention relates to lenses and more particularly to catadioptric lenses. Still more particularly the invention relates to such lenses manufactured by molding or casting suitable lens material in dies the cavities of which are finished to directly produce finished cast optical surfaces on the molded lenses. Still more particularly the invention relates to molded catadioptric lenses of suitable thermoplastic material of the kinds and types now used extensively on automotive vehicles in tail light, stop light, direction signal and similar applications.

Amongst the objects of the invention, are; to provide cast lens structure embodying novel and improved light refracting and diffusing surface applicable to lenses generally, to provide catadioptric lens structure embodying elements incorporating such surface, to provide improved catadioptric lens structure embodying a plurality of catadioptric elements the refracting and reflecting surfaces of which are so shaped and related as to provide an improved pattern of contiguous beams of overlapping nature productive of a field of improved uniformity of light intensity over the designed field of light projection, to provide catadioptric lens structure of such nature which is also less sensitive to location of the source of light for the lens, such for example as the filament of an incandescent bulb, with respect to the designed source location than is the case with such lenses of conventional design, to provide improved catadioptric lens structure embodying circular concentric catadioptric elements, the light refracting and reflecting surfaces of which are so formed and related as to minimize the ring effect of alternate light and dark rings produced by conventional forms of catadioptric lenses, and to provide improved catadioptric lenses which further minimize the so-called spoke effect produced by circular catadioptric lenses of conventional form and by Fresnel lenses, when such lenses are viewed from a point laterally away from the optical axis of the lens.

Further objects of the invention and the advantages to be derived from its use will become evident from the ensuing portion of this specification, which by way of example but without limitation describes and discusses the invention as applied to the production of a circular catadioptric lens of molded thermoplastic material for emitting a conical beam from a given light source, as for example a lens suitable for an automotive type tail light or direction signal.

For use such as that noted above, official specifications covering the nature of the intensity and uniformity of the light beam emitted from the lens must frequently be met and in many instances the beams from conventional forms of catadioptric lenses will not meet such specifications since the distribution of light from such lenses within a given cone is not uniform, but takes the form of a number of concentric alternating light and dark annular bands in which the light intensity in the latter is insufficient to meet the specification. Also, in such lenses and in circular Fresnel lenses as well there is produced a characteristic spoke effect when the lens is viewed from a point off the optical axis, such spoke effect being created by an apparent concentration of the light in two co-linear radial wedge-shaped areas the apexes of which are located at the center of the lens.

Also, catadioptric lenses of conventional form from which alternating light and dark bands of light are projected are relatively very sensitive to the location of the source of light with respect to the exact or theoretical location of the light source. Variations in the location of the source of light from the design point results, with such lenses, in aggravating the alternating light and dark band effect, and in practical applications it is substantially impossible to ensure location of the light source exactly at the design point. The reason for this is that in automotive and similar applications of the kind under discussion, the source of light is in substantially all cases the filament of an electric bulb and manufactures of such bulbs do not hold the filament location within close tolerance limits with respect to the base of the bulb. Also in most such applications, the bulb is removable from a socket in a lamp structure in which the lens is removably fixed and such lamp structures are not ordinarily manufactured as precision articles but usually are subject to dimensional variations within relatively course tolerances. Cumulatively, the effect of such dimensional variations may be to place the light source an appreciable distance from the design point in a given installation.

As hereinabove indicated, it is the general object of the present invention to minimize and so far as possible eliminate the weaknesses and deficiencies of structures of the nature under discussion as heretofore produced and to this end the invention contemplates improvements the nature of which and the relation of which to each other may best be explained with reference to the specific example of lens and means for manufacture thereof now to be described in conjunction with the accompanying drawings forming a part hereof in which.

Figure 1:
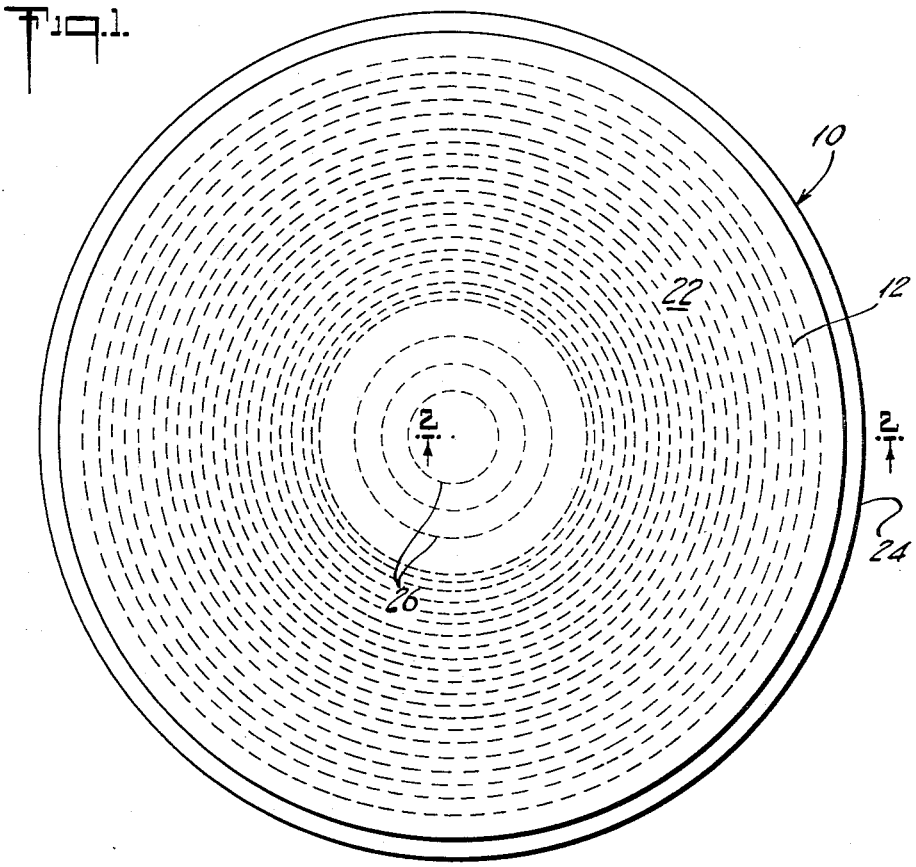
Fig. 1 is a front elevation of a circular catadioptric lens embodying the principles of the invention and adapted to project from a suitable light source a conical beam of light such as is required in many automotive applications.
Figure 2:
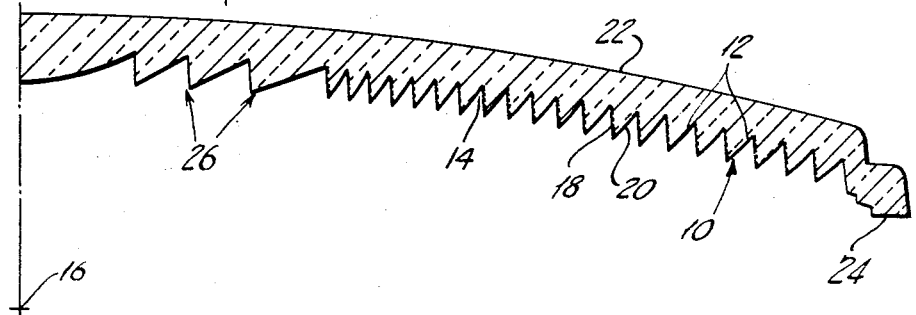
Fig. 2 is a half section on enlarged scale of the lens shown in Fig. 1.

Figs. 3 to 8, inclusive, are diagrams illustrative of light patterns produced by catadioptric lens elements such as are embodied in the lens shown in Figs. 1 and 2, Fig. 3 being illustrative of a conventional catadioptric lens form and Figs. 4 to 8 being illustrative of various forms and combinations of lens surfaces embodying the principles of the present invention;

Fig. 9 is a fragmentary section on greatly magnified scale and of more or less diagrammatic and conventionalized nature illustrative of a lens die surface and a section of a lens body cast thereon, embodying certain features of the invention;

Fig. 10 is a fragmentary plan view illustrative of the surface of the lens body shown in Fig. 9;

Fig. 11 is a view similar to Fig. 9 illustrative of a different modification of the kind of surface shown in Fig. 9;

Fig. 12 is a view similar to Fig. 10 illustrative of the lens surface shown in Fig. 9;

Fig. 13 is a longitudinal central section of a die embodying features of the invention and providing a cavity shaped to produce a lens of the general configuration shown in Figs. 1 and 2; and Fig. 14 is a perspective view, partly broken away, of one of the die elements of the die illustrated in Fig. 13.

Referring now more particularly to Figs. 1 and 2, the lens illustrated and indicated generally at 10 is circular and of a kind suitable for automotive use such as for a tail light, flashing direction signal, or other like purposes. The lens is made of suitable light transmitting material, the preferred nature of which will hereinafter be discussed, and in accordance with certain aspects of the invention is cast or molded in a suitable die, the preferred nature and manufacture of which will later be described.

The radially outer part of the lens is catadioptric and may be said to be comprised of a plurality of contiguous annular catadioptric elements 12 each of which embodies on the light receiving face 14 of the lens, which is adapted to receive light from a suitable source 16 located at the designed source point of the lens, a light transmitting and refracting surface 18 and a light reflecting surface 20, the refracting and reflecting surfaces being angularly related with respect to each other and being disposed in alternation radially of the lens. Each of the catadioptric elements also comprises a light transmitting and emitting surface on the light emitting face of the lens and in the embodiment illustrated the light emitting surfaces of the several elements constitute contiguous portions of a spherically curved light emitting face 22. Radially outside the catadioptric portion of the lens, the lens is provided with a suitable retaining rim 24 which may be of any desired configuration for mounting the lens. The term "contiguous" as used in this case is to be understood as meaning abutting or touching and is not to be construed as meaning "adjacent." In other words, the catadioptric elements abut or touch each other and are not so separated as to be defined by the term "adjacent."

The central portion of the lens illustrated is not of catadioptric nature and may be of any desired configuration, the example shown having a refracting type of center comprised of a number of concentrically arranged light refracting elements 26. So far as the present invention is concerned, the specific type of center is immaterial and if desired could be omitted entirely.

The concentric arrangement of catadioptric ring elements is a known arrangement, and in Fig. 3 there is shown on greatly enlarged scale a section of a lens, such as that illustrated in Figs. 1 and 2, in which catadioptric elements of conventional nature are employed, the figure further showing the nature and distribution of the light rays and beams emanating from such a lens. In the figure, the light receiving and refracting surfaces of the several elements are again indicated at 18, the light reflecting surfaces at 20, and the light emitting surface at 22. The surfaces 18 and 20 are of straight conical configuration, the surface 22 being spherically curved, and it is assumed that all of the surfaces are smooth, highly polished surfaces in conformity with conventional lens practice. The light rays emanating from the light source 16 at the designed location point are indicated by the lines $a_1$, $a_2$, $a_3$, $a_4$, and $b_1$, $b_2$, $b_3$, and $b_4$, the rays indicated being substantially the marginal rays of the beams of light transmitted by the different catadioptric elements.

With catadioptric elements provided with conventionally shaped and arranged surfaces of the nature above described, the beams of light transmitted by the several catadioptric elements are of a diverging nature but the divergence is relatively very small, the angle of divergence between the marginal rays of the individual beams being of the order of one degree.

For all practical purposes the beams emitted from conventionally formed catadioptric elements are comprised of substantially parallel rays and for the projection of a concentrated beam of light this may be satisfactory. However, when it is desired to project light in the form of a spreading beam, such for example as a conical beam from the circular lens illustrated in Figs. 1 and 2, the substantially parallel rays of each of the several beams emitted from the catadioptric elements, result in the beams diverging from each other as indicated in Fig. 3, wherein the beam emitted from the innermost element $12_1$ is indicated between the rays $a_1$—$b_1$, the beam emitted from the element $12_2$ is indicated between the rays $a_2$—$b_2$, etc. As will be seen from the diagram, the overall beam projected from the lens comprises a number of concentric bright rings of light 28 formed by the beams projected from the several lens elements with intervening darker rings 30 produced by the divergence of the beams emitted from the several elements. While theoretically the lens would project a source of sharply defined separate concentric rings of light separated by dark bands or rings, the practical effect of unavoidable diffusion of light eliminates sharp lines of demarcation between light and dark rings, but with such diverging beams the difference in light intensity at different distances from the axis of the lens can readily result in failure of the lens to meet specifications calling for minimum light intensity at any radius within the field of the designed beam.

As hereinbefore noted, it is one of the objects of the present invention to minimize and in so far as possible, eliminate the above discussed deficiency which may for convenience be referred to as the "ring effect" characteristic of conventional forms of catadioptric lenses projecting spreading beams, and in the diagram of Fig. 4 there is illustrated one modification of lense configuration embodying certain of the principles of the present invention which may be employed to minimize the so-called ring effect.

Referring now to this figure, the lens surfaces, the marginal light rays and light source are similar to those shown in Fig. 3 and are similarly designated. The difference between the configuration shown in Fig. 3 and that shown in Fig. 4 is that in the latter figure the reflecting surfaces 20 of the several catadioptric elements are curved so that the cross sections of the surfaces are curved in the plane of the figure, which plane contains the light source and the lens and is normal to the lines of separation between any two contiguous lens elements. In the case of a circular lens this plane may be any radial plane containing the optical axis of the lens. The curved surfaces 20 are in the embodiment illustrated spherically curved convexly about a radius 32 which may, for example, be slightly less than the radius of the ring embodying the reflecting surface.

As will be observed from the diagram of Fig. 4, the effect of curving the reflecting surfaces is to so direct the rays of the individual beams from the several catadioptric elements that they converge upon and cross each other a short distance in front of the light emitting face of the lens, the rays of the several individual beams thereafter diverging so that the contiguous beams overlap, as will be seen from the overlapping relation of the marginal ray $b_2$ of the beam emitted from element $12_1$, and like overlapping relationships between rays such as $b_3$ and $a_2$, etc.

The desired overlap of the several individual beams may also be obtained by curving the light receiving and refracting surfaces of the several elements to produce individual beams, the rays of which as emitted from the lens diverge so that the several beams emitted from the different elements overlap. Such an arrangement is shown in Fig. 5 wherein the light receiving and refracting surfaces 18 are concavely curved about radius 34 which also may be slightly less than the radius of the ring embodying the surface. With this arrangement the marginal rays $a_1$—$b_1$, $a_2$—$b_2$, etc., of the individaul beams diverge to produce converging rays such as $b_1$ and $a_2$ from contiguous beams, which overlap as indicated in the figure. In this instance concave curvature is employed because of the fact that there is a normal divergence or spread with the conventional form discussed in connection with Fig. 3.

If a convex curvature were employed for the surfaces 18 it would tend to counteract such normal spread so that a greater amount of curvature would be required to achieve a spread of a magnitude equal to that obtained with a concave curvature.

Obviously both the light receiving surfaces and the reflecting surfaces may be curved and such an arrangement is shown in Fig. 6. With this arrangement the curvature of the light receiving surface is made convex because it tends to work in the same direction as the curved reflecting surface. Ordinarily curving of both surfaces would not be employed in actual practice since any greater spread that might be obtained from curving both surfaces can be secured by employing a greater degree of curvature of either one of the two surfaces.

In all of the examples above described it is assumed that the light refracting and reflecting surfaces are smooth, polished surfaces and with such surfaces the spread of the beams is effected in the plane of the paper, that is, in any radial plane containing the optical axis of the lens. Spreading of the beams in this fashion operates to substantially eliminate the ring effect and to present a lens which appears to be filled with light of substantially uniform intensity when viewed from a point on the optical axis of the lens. With polished curved surfaces, the so-called spoke effect is, however, not eliminated when the lens is viewed from a point within the field of the designed beam but off the optical axis.

In order to minimize the so-called spoke effect, the light rays are further, in accordance with another of the aspects of the present invention, subjected to diffusion so that the rays are spread conically in all directions with respect to the axis of the incident ray that is diffused.

Such diffusion may be effected in different ways, as will hereinafter be more fully pointed out, but for the purposes of the present discussion it will be assumed that the desired diffusion is obtained in a lens of the kind under consideration by providing on each of the catadioptric elements a light refracting surface which is roughened as compared with a highly polished optical surface to provide a multiplicity of minute projections on the surface, which act more or less like tiny individual light diffusing lenses, the nature of the surface, as compared with a highly polished optical surface, appearing more or less like an etched or frosted surface of matte-like nature.

In accordance with the present invention such a diffusing surface when employed in a catadioptric lens of the kind under consideration is preferably the light receiving and refracting surface of the lens and in Figs. 7 and 7a there is diagrammatically shown the effect of the use of such a surface for the light receiving surfaces 18 of the catadioptric elements of a lens of the kind illustrated in the previously described figures.

Referring now to Figs. 7 and 7a, elemental bundles of rays $c_1$, $c_2$, $c_3$, and $c_4$ have been indicated, one directed to each of the illustrated catadioptric elements. As will be seen from the figures, these, when refracted at the diffusing refracting surface 18a, are also spread to conical form as indicated by the rays $c_1{}^a$, $c_1{}^b$, $c_1{}^c$, etc. When the spread rays are reflected from the reflecting surfaces 20 their divergence is continued so that the effect is to provide diverging beams from the several contiguous catadioptric elements. The difference between the type of spread produced by diffusion surfaces such as the surfaces 18a, and curved and polished surfaces, is that with the diffusion surfaces the spread of light is conical and not confined to a plane.

In the example illustrated in Fig. 7 the diffusion surfaces 18a are shown in conjunction with straight reflecting surfaces 20 and as will be evident from the diagram of that figure, sufficient spread may be obtained from the use of diffusion surfaces alone to produce adequate overlapping of the beams from contiguous catadioptric elements.

Preferably, however, diffusion surfaces such as surfaces 18a, are employed in conjunction with curved reflecting surfaces 20 of the kind shown in Fig. 4 and for manufacturing and other practical reasons the preferred form is as shown in Fig. 8 in which the light receiving and refracting surfaces and the light reflecting surfaces are of the same contour as illustrated in Fig. 4, but with the light receiving and refracting surfaces 18 roughened to provide the desired diffusion surfaces. In the diagram of Fig. 8 the terminal rays $a_1$—$b_1$, $a_2$—$b_2$ etc. directed to the several catadioptric elements have been indicated, the diagram further showing the nature of the spread of the rays effected by the diffusion surfaces and the converging, crossing and overlapping relation of the spread and reflected rays which give the desired overall beam of substantially uniform light intensity anywhere in the field of the beam.

While it is evident that any of the surfaces of the lens elements can be made of diffusing character by providing a roughened surface, it is to be pointed out that in a catadioptric system it is not feasible to use other than a precision polished surface conforming with the area configuration of the surface for the reflecting surface of the element. If it were attempted to employ a roughened surface for the reflecting surface, the result would be that a large proportion of the light rays directed toward the surface would strike the surface at angles less than the critical angle and would be refracted through the surface rather than internally reflected by the surface, and thus lost to the system.

It will further be evident that when diffusion of the nature above described is desired, it can be obtained by roughening the light emitting surface of the lens, which is a refracting surface and can be shaped to give desired refracting characteristics but ordinarily such procedure is not desirable since in most applications a smooth and polished exposed lens surface is desirable from appearance standpoint and in many kinds of services is also desirable because of the practical consideration of maintenance of a clean and efficient light emitting surface.

In order to secure effective results from the use of diffusing surfaces, it is essential that the nature of the surfaces be closely and accurately controlled and in the manufacture of molded lenses of the kind with which the present invention is primarily concerned, the desired diffusing lens surfaces are obtained by forming on the die in which the lens is molded, surfaces which are complementary to the diffusing surfaces desired on the lens.

We have found that for the purposes of the present invention one very satisfactory method of producing the desired kind of surface is by roughening the die surfaces that have been formed to desired area contour, or configuration by means of a peening or abrading operation effected by forcibly impinging the surface to be roughened with a very finely divided abrasive material suspended in a liquid carrier and blasted against the surface to be roughened by compressed air or other gaseous fluid in the manner of sand blasting operations, the process being in fact a wet honing blast. This process in its broader aspects is known and has previously been used for other purposes, being generally known as "liquid honing" or "vapor blast liquid honing." For the purposes of the present invention various abrasives may be employed but we have found that a suitable abrasive is an oxide of silicon of the kind known commercially as "Novaculite," which produces a satisfactory surface when powder of such material of approximately 325 mesh fineness is used with water as a carrier, to which there may or may not be added a suitable rust inhibiting chemical.

While liquid honing as above described has been generally used heretofore as a finishing operation for improving the finish of rougher or more irregular surfaces, we have found that for the purposes of the present invention satisfactory results are not obtained by forming die surfaces to a relatively rough and semi-finished state and employing liquid honing to bring the surfaces to the finally desired area contour and surface finish. To obtain the desired results, the die surfaces which are to produce the diffusing surfaces of the lens, are first precision finished to desired area contour and highly polished, and the polished surfaces thereafter subjected to the honing operation which produces the desired roughened finish without materially altering the area contour of the surface.

In many cases even more accurate control of the diffusing characteristic of the lens surface is desired than can be effected by the honing process alone and in such cases the die surfaces which are to produce the diffusing lens surfaces are first precision finished to area contour, then liquid honed, and then subjected to a final polishing operation which operates to remove the tops of the myriad of projections and produces on the surface a polished area conforming with the area configuration of the surface and acting as non-diffusing refracting surface. By suitably controlling the extent of final polishing in relation to the height of the projections, close control may be obtained of the light diffusing characteristic of the lens surface produced by the die surface, an important consideration in the manufacture of molded lenses on a production basis which requires the use of multiple dies, all of which must produce lenses having substantially identical optical characteristics.

In Figs. 9 to 12 there is illustrated on greatly magnified scale (the magnification being of the order of 100 times or more) and in more or less diagrammatic and conventionalized form the general character of roughened surface of the nature contemplated by the present invention for effecting diffusion as well as refraction of light. Fig. 9 shows a fragmentary section of a die element 64, the surface 68 of which has been liquid honed to produce a multiplicity of minute depressions 36 with intervening projecting portions 38, and a fragmentary section of the body 10 of a lens element, the complementary surface 18 of which is formed with a multitude of projections 36a with intervening recessed portions 38a. The face 18 of the lens is shown in plan view in Fig. 10. With a surface such as that indicated in Figs. 9 and 10, the projections on the face of the lens act as tiny individual light dispersing lenses.

Figs. 11 and 12, similar respectively to Figs. 9 and 10, illustrate roughened die surface that has been subjected to a subsequent polishing operation to produce a polished area of controlled extent by removal of the tops of the projecting portions of the die face formed by the honing operation. By such final polishing operation the bottoms of the depressed portions of the lens surface are smoothed to provide a polished area 40 conforming with the area configuration of the lens and interrupted by a multiplicity of light diffusing projections 36 distributed over the polished area. Obviously, the relative areas of the polished and light diffusing portions of the surface can readily be controlled by the extent to which the final polishing operation is carried out on a honed surface of given texture.

It will be evident to those skilled in the art that other specific abrading or peening methods, such as mechanical peening, may be employed to roughen previously formed and polished die surfaces to roughen them, followed if desired by a final polishing operation to produce a desired proportion of polished area, but we have found the above described liquid honing method to be highly satisfactory, particularly from the standpoint of providing an accurately controlled diffusing characteristic for a given lens surface.

As will be apparent from inspection of Figs. 1 to 8 the production of precision surfaces, both of a highly polished nature and with a controlled roughened surface, in a die having a multiplicity of relatively small angularly related surfaces such as is necessary for the production of a molded catadioptric lens, presents an exceedingly difficult problem and in another of its aspects the present invention contemplates a novel form of die and the manufacture thereof, by means of which lenses of the kind under discussion may be accurately produced at reasonable cost inclusive of the costs of the die.

Referring now more particularly to Figs. 13 and 14, there is illustrated a suitable form of die embodying the principles of the invention for producing a lens having the general configuration of the lens shown in Figs. 1 and 2.

Referring now more particularly to Fig. 13, the die illustrated and indicated generally at 42 comprises two separable die units or blocks 44 and 46 adapted to be mounted in an injection molding or die casting machine for relative movement toward and away from each other, the plane of partition between the blocks being indicated at 48.

In Fig. 13 the die blocks are shown closed and form between them the cavity 50 into which the material from which the lens body is formed is injected through the gate opening 52.

The die block 44 comprises a part 54 having a highly polished spherically curved die surface 56 for forming the light emitting surface of the lens. Part 54 is encircled by a separate part 58 having annular die surface 60 for forming the flange portion of the lens. These parts are rigidly fixed together, block 44 being made of separable parts rather than integral solely for facilitating the forming of the surfaces 56 and 60.

The die block 46, which forms the light receiving and light reflecting surfaces of the lens, comprises a base plate 62 to which is rigidly fixed an assembly of telescoped tubular die elements 64 the end surfaces of which are formed to provide the desired light receiving and light reflecting surfaces of the several catadioptric elements of the lens. In the example shown each of these elements is formed with two angularly related annular end surfaces denoted respectively at 66 and 68. These end surfaces are not only angularly related with respect to each other but also with respect to the central longitudinal axis of the element upon which they are formed and by comparison of Figs. 13 and 14 with any one of Figs. 4 to 8 it will be apparent that the end surfaces 66 of the mold elements form the reflecting lens surfaces 20 while the surfaces 68 form the refracting lens surfaces 18. For purposes of discussion it may be assumed that the elements 64 are finished to form lens surfaces of the kind shown in Fig. 8, the surfaces 66 being convexly curved and polished and the surfaces 68 having a roughened texture.

In accordance with the principles of the invention the end surfaces of the individual elements 64 are brought to desired final finished condition by appropriate manufacturing operations of well known nature for producing the polished die surfaces of desired contour, and by operations of the kind hereinbefore described for producing roughened die surfaces having controlled texture characteristics. These operations are advantageously carried out independently on the separate tubular elements. It will be evident that in such manufacture the surfaces may be shaped and finished so as to give any of the several configurations of surfaces hereinbefore discussed. For such a lens it will be evident, however, that the die surfaces for forming the reflecting surfaces will be of generally conical form, the term "generally conical" as used herein being intended to include surfaces which are curved in cross section such as the surfaces 20 of Figs. 7 and 8 and the surfaces 18 of Figs. 5 and 6. In the embodiment illustrated the surfaces 68 are also made slightly conical as indicated, this however not being essential for optical reasons but in order to provide sufficient draft to permit ready stripping of the molded lens from the face of the die block. So far as optical considerations are concerned, surfaces 68 might be cylindrical.

In the illustrated embodiment, the central portion of the die block assembly is comprised of a central core piece 70 and tubular ring elements 72, the ends of this group of elements being shaped to produce any desired lens configuration at the center of the lens.

For assembling the several elements to the base plate the center element and the elements 72 are telescoped in closely fitting relation to prevent lens material from being forced between them by the molding operation, and are held in fixed axial relation by means of a suitable dowel pin 74 extending through appropriate bores in the elements. Elements 64 are likewise telescoped in closely fitting relation, and are held against axial displacement by suitable dowel pins 76. The innermost of the elements 64 is provided with a thickened base ring portion 64a which is engaged by the inner end of the outermost of the elements 72, which is shorter than the adjacent element to which it is fixed. A stud 78 threaded into the core piece 70 operates to clamp the two assemblies of tubular elements to the base ring 62 and an outer ring-shaped die member 80 is provided which seats against a shoulder 82 on the outermost of the tubular elements 64 and further provides the die surfaces 84 for forming the marginal flange portion of the lens. The ring-shaped die member 80 is also further provided with a number of axially extending bores distributed around the circumference and registering with the flange portion of the die cavity, one of such bores being shown at 86 and these bores being adapted to receive stripping pins for stripping the lens from the face of the die block after the mold is opened.

Reverting to the nature of the lens structure obtainable through the use of the present invention, and particularly with reference to the forms and arrangements of refracting and reflecting surfaces discussed in connection with Figs. 4 through 12, it will be apparent that many of the novel features of the invention are of more general application and utility than for the particular kind of lens described as the illustrative example.

Thus, the various combinations of specific refracting and reflecting surfaces, as illustrated in the diagrams of Figs. 4 to 8, also may be considered as being embodied in straight linear catadioptric elements extending normal to the planes of the drawings and projecting light from different kinds of sources including elongated sources such, for example, as fluorescent tubes extending parallel with the axes of the elements. In such applications, as well as with the specific example hereinbefore described, the spreading of the rays of the several contiguous beams so that the beams overlap may be accomplished in accordance with the principles of the invention in the same general fashion whether the longitudinal axes of the catadioptric elements are straight or curved.

The reduction in sensitivity to filament location is also independent of the specific configuration of the axes of the elements, that is, whether they be straight or curved, but for purposes of explanation the phenomenon may be discussed as it applies to the circular form of lens shown herein. As previously, noted, in a catadioptric system using neither curvature nor diffusion, each element ring emits a bundle of rays having approximately 1° spread, and in designing such a lens the designer would locate the surface so that the rays from one or more contiguous beams would be concentrated at a point on the optical axis a predetermined distance from the lens, which might for example be the test point of some specification to be met. Since in a catadioptric system movement of the light source from the design point away from the lens causes the rays from all rings to diverge and movement of the source from such point toward the lens causes convergence, it will be evident that change of location of the source from the designed location will cause the rays intended to be concentrated at the test point to either diverge therefrom or converge and cross short of the point. In either event the change will result in the creation of a relatively dark spot at the selected or test point and it will be evident that the smaller the light spread of the several rings, the more sensitive will be the lens system to the location of the light source. If through the utilization of curvature or diffusion, or both, in accordance with the principles of the present invention, the light rings or beams are caused individually to have a 10° spread, the rings can illuminate an area extending from —5° to +5° with respect to the angle to the test point. With such a construction, variation in the position of the light source causing a divergence or convergence of as much as 4° does not cause the creation of a dark spot since the area illuminated by the rings would thus be from —1° to +9° or vice versa, the test point still being within the zone of illumination. Obviously the principles above discussed apply equally with respect to curved or straight catadioptric elements.

As will further be evident to those skilled in the art, forms of lenses other than catadioptric lenses may for various purposes advantageously make use of diffusing surfaces of the kind herein disclosed and in which the diffusing characteristic of the surface may be accurately controlled by the procedures herein described.

Also, it will be evident that through the combinations of surfaces having features of curvature and diffusion characteristic embodying the principles of the present invention, extremely wide latitude is afforded the designer in the design of particular lenses to meet particular specifications, since the nature and extent of the spread and direction of the rays can be varied between relatively wide limits by appropriate selection of radii of curvature of the surfaces and/or diffusion characteristics of the refracting surfaces.

Further, the novel features of die design and construction enable a wide latitude of lens design to be made available, since such features enable the desired form and arrangement of refracting and reflecting surfaces to be made in a way which without such improvements would be impossible. To illustrate this it is only necessary to consider the nature of the lens design herein disclosed, which is an article that has been commercially produced on a quantity basis. The lens illustrated has an overall diameter of approximately 4 inches, the catadioptric portion thereof being formed by 20 ring elements each having refracting surfaces with an angularity of 2½° with respect to the longitudinal axis of the element and reflecting surfaces varying with the different elements from approximately 30° to approximately 47° with respect to such axis. Also, as has been indicated in Fig. 13, the thickness of the various ring elements varies from a minimum of approximately .095 inch for the inner element to approximately .150 inch for the outer element, the thickness increasing generally progressively with increase in diameter of the element. It will thus be seen for the lens illustrated, the widths of the annular die surfaces for producing the reflecting lens surfaces and also the refracting lens surfaces, the latter die surfaces advantageously being honed, are extremely small, the nature and arrangement of the die surfaces further being such that it would be practically impossible to liquid hone the desired surfaces if they were incorporated in a one piece die body.

Since all of the various factors of angles, textures, shapes and sizes of surface areas are variable factors which can be altered in accordance with the desires of the designer when the present invention is availed of, it will be apparent that through it the very widest of latitude in design is made available to the designer.

Also it will be seen that a multitude of very small surfaces can readily be provided, which surfaces may be of great precision and have either polished or controlled diffusion characteristics, because of the features of the invention which contemplate the formation of such surfaces independently on small individual die elements that are later assembled to produce a multi-surfaced die face comprising surface texture and disposition which could never be obtained on an integral die face.

So far as the materials to be employed in the manufacture of dies are concerned, metal, ordinarily ferrous metal of a nature capable of taking a high polish, will usually be employed but the invention is not limited to the manufacture of metal dies if other and equivalent hard die materials suitable for the purpose are available.

For the manufacture of lenses making use of the advantages of the invention any moldable light transmitting optical material may be employed but in order to secure the most advantageous results, not only because of the advantageous values of the index of refraction of the material, but also because of its ability to conform precisely to the minute surface configurations of a die, certain of the commercially available thermoplastic materials are highly satisfactory, methyl methacrylate, known commercially under the trade name of "Lucite" being a preferred material and polystyrene, sold commercially under the trade names "Styron" and "Lustrex," also producing commercially acceptable lenses of quality.

From the foregoing it will be apparent that the principles of the invention are susceptible of application to many different specific forms and kinds of lenses and to many variants of die construction and procedures for forming lens surfaces. It will also be evident that certain features of the invention may be employed to the exclusion of others and it is therefore to be understood that the invention is not in any sense limited to the examples hereinbefore described by way of illustration but is to be considered as comprising all features of novelty falling within the scope of the appended claims.

What is claimed:

1. A lens having a plurality of annular concentric contiguous catadioptric elements, each element comprising a light receiving and refracting surface for transmitting light received from a given source, said surface having a light diffusing finish provided by a multiplicity of minute projections and intervening depressed areas whereby a light ray entering said surface will be emitted therefrom in the form of a cone, a light reflecting surface disposed at an angle to said refracting surface for receiving diffused light from said refracting surface and reflecting the same internally of said element in a conical pattern and a light transmitting and emitting surface spaced from said reflecting surface and through which the reflected light passes from the lens whereby the light rays emanating from each element through the transmitting and emitting surface overlap the rays from the contiguous elements on each side to provide a light beam of substantially uniform intensity over the entire area of the lens occupied by said elements.

2. A lens having a plurality of contiguous catadioptric elements, each element comprising a light receiving and refracting surface for transmitting light received from a given source, said surface having a light diffusing finish provided by a multiplicity of minute projections and intervening depressed areas whereby a light ray entering said surface will be emitted therefrom in the form of a cone, a light reflecting surface disposed at an angle to said refracting surface for receiving diffused light from said refracting surface and reflecting the same internally of said element in a conical pattern and a light transmitting and emitting surface spaced from said reflecting surface and through which the reflected light passes from the lens whereby the light rays emanating from each element through the transmitting and emitting surface overlap the rays from the contiguous elements on each side to provide a light beam of substantially uniform intensity over the entire area of the lens occupied by said elements.

3. A lens having a plurality of contiguous catadioptric elements, each element comprising a light receiving and refracting surface for transmitting light received from a given source, said surface having a light diffusing finish whereby a light ray entering said surface will be emitted therefrom in the form of a cone, a light reflecting surface disposed at an angle to said refracting surface for receiving diffused light from said refracting surface and reflecting the same internally of said element in a conical pattern and a light transmitting and emitting surface spaced from said reflecting surface and through which the reflected light passes from the lens whereby the light rays emanating from each element through the transmitting and emitting surface overlap the rays from the contiguous elements on each side to provide a light beam of substantially uniform intensity over the entire area of the lens occupied by said element.

4. A lens having a plurality of contiguous catadioptric elements, each element comprising a light receiving and refracting surface for transmitting light received from a given source, said surface having a light diffusing finish whereby a light ray entering said surface will be emitted therefrom in the form of a cone, a light reflecting surface disposed at an angle to said refracting surface for receiving diffused light from said refracting surface and reflecting the same internally of said element in a conical pattern and a light transmitting and emitting surface spaced from said reflecting surface and through which the reflected light passes from the lens whereby the light rays emanating from each element through the transmitting and emitting surface overlap the rays from a contiguous element to provide a light beam of substantially uniform intensity over the entire area of the lens occupied by said elements.

5. A lens as defined in claim 4, in which said light reflecting surface is concave with respect to said light receiving and refracting surface.

6. A lens as defined in claim 4, in which said light reflecting surface is convex with respect to said light receiving and refracting surface.

7. A lens as defined in claim 4, in which the light diffusing finish on said light receiving and refracting surface is provided by a multiplicity of minute projections and intervening depressed areas and in which the tops of said projections are polished plane surfaces.

8. A lens having a plurality of contiguous catadioptric elements, each element comprising a light receiving and refracting surface for transmitting light received from a given source, said surface being polished, a light reflecting surface disposed at an angle to said refracting surface for receiving light from said refracting surface and reflecting the same internally of said element, a light transmitting and emitting surface spaced from said reflecting surface and through which the reflected light passes from the lens and a light diffusing finish on said transmitting and emitting surface provided by a multiplicity of minute projections and intervening depressed areas whereby the light rays emanating from each element through the transmitting and emitting surface overlap the rays from a contiguous element to provide a light beam of substantially uniform intensity over the entire area of the lens occupied by said elements.

9. A lens having a plurality of contiguous catadioptric elements, each element comprising a light receiving and refracting surface for transmitting light received from a given source, said surface having a light diffusing finish whereby a light ray entering said surface will be emitted therefrom in the form of a diffused pattern, a light reflecting surface disposed at an angle to said refracting surface for receiving diffused light from said refracting surface and reflecting the same internally of said element in a diffused pattern and a light transmitting and emitting surface spaced from said reflecting surface and through which the reflected light passes from the lens whereby the light rays emanating from each element through the transmitting and emitting surface overlap the rays from a contiguous element to provide a light beam of substantially uniform intensity over the entire area of the lens occupied by said elements.

References Cited in the file of this patent

UNITED STATES PATENTS 586,220  Basquin _____ July 13, 1897

(Other references on following page)

UNITED STATES PATENTS

| Number | Name | Date |
|---|---|---|
| 720,987 | Wadsworth | Feb. 17, 1903 |
| 801,766 | Churchill | Oct. 10, 1905 |
| 1,393,573 | Ritter | Oct. 11, 1921 |
| 1,399,143 | Moriarty | Dec. 6, 1921 |
| 1,410,898 | Dorey | Mar. 28, 1922 |
| 1,483,636 | Horni | Feb. 13, 1924 |
| 1,500,185 | Gage | July 18, 1924 |
| 1,504,970 | Pascucci | Aug. 12, 1924 |
| 1,613,276 | Hill | Jan. 4, 1927 |
| 1,944,154 | Dickson | Jan. 23, 1934 |
| 1,955,599 | Lambin-Parent | Apr. 17, 1934 |
| 1,986,065 | Maillet | Jan. 1, 1935 |
| 2,114,573 | Rhodes | Apr. 19, 1938 |
| 2,147,914 | Morehead | Feb. 21, 1939 |
| 2,185,262 | Lupo | Jan. 2, 1940 |
| 2,272,119 | Jaeckel | Feb. 3, 1942 |
| 2,275,602 | Beck et al. | Mar. 10, 1942 |
| 2,333,131 | Tillyer et al. | Nov. 2, 1943 |
| 2,432,668 | Kingston | Dec. 16, 1947 |
| 2,441,747 | Beshgetoor | May 18, 1948 |
| 2,443,390 | Kingston | June 15, 1948 |
| 2,469,080 | Rosin | May 3, 1949 |
| 2,473,588 | Johnson | June 21, 1949 |
| 2,504,301 | Cassin | Apr. 18, 1950 |
| 2,506,521 | Spindt | May 2, 1950 |
| 2,588,373 | Erban | Mar. 11, 1952 |